(12) United States Patent
MacKarvich

(10) Patent No.: US 6,612,602 B1
(45) Date of Patent: Sep. 2, 2003

(54) BOAT TRAILER ROLLER MOUNT

(76) Inventor: Charles J. MacKarvich, 3940 Paces Manor Dr., Atlanta, GA (US) 30339

( * ) Notice: Subject to any disclaimer, the term of this patent is extended or adjusted under 35 U.S.C. 154(b) by 0 days.

(21) Appl. No.: 10/145,475

(22) Filed: May 14, 2002

(51) Int. Cl.[7] .................................................. B60P 3/10
(52) U.S. Cl. ..................................... 280/414.1; 410/92
(58) Field of Search ........................... 280/414.1, 414.2, 280/414.3; 410/52, 92

(56) References Cited

U.S. PATENT DOCUMENTS

| | | | |
|---|---|---|---|
| 4,900,216 A | * 2/1990 | Godbersen | 414/534 |
| 4,997,332 A | * 3/1991 | Johnson | 414/534 |
| 5,316,329 A | 5/1994 | MacKarvich | 280/414.1 |
| 5,951,231 A | * 9/1999 | Allen | 414/462 |

* cited by examiner

Primary Examiner—Kevin Hurley
(74) Attorney, Agent, or Firm—Thomas, Kayden, Horstemeyer & Risley

(57) ABSTRACT

The boat trailer (3) includes pivotal support beams (5) that are pivoted intermediate their ends. Pairs of boat hull support rollers (13) are mounted on the ends of the roller mounting arms (7) and are slidably supported by the mounting blocks (9). The overhanging shoulders (30 and 31) of the opposed halves of the mounting block rest on the parallel support edges (47) of the notches (40) at the ends of each pivotal support beam (5). The shallow U-shaped arch (15) of the pivotal roller mounting arm (7) slides along its length through the compatibly shaped channel (20) of the mounting block (9) so that the rollers (13) at the opposite ends of the roller mounting arm can move with respect to each other upwardly or downwardly so as to maintain constant contact with the changing shape of the boat hull of a boat trailer as the boat is rolled onto or off of the trailer.

16 Claims, 3 Drawing Sheets

BOAT TRAILER ROLLER MOUNT

FIELD OF THE INVENTION

This invention relates to a boat trailer having roller mounts that are adjustable when the boat support rollers are engaged by the hull of a boat being mounted on the trailer, to reposition the boat support rollers of the trailer so that they conform to the progressively changing shape of the boat hull as the boat is rolled onto the trailer.

BACKGROUND OF THE INVENTION

Traditional boat trailers for transporting boats have roller assemblies mounted thereon for rolling boats onto and rolling the boats off of the trailer, and for firmly supporting a boat during transport while on the trailer. Almost all boat hulls have a compound curvature from stem to stem, so that the roller assemblies of most trailers are adaptable to the changing curvature of the boat as it is moved along the roller assemblies during loading and unloading of the boat with respect to the trailer.

Prior art roller mounts that support the rollers can include pairs of rollers on the ends of pivotal support beams, and the pivotal support beams usually are pivoted intermediate their ends about a centrally disposed axis. As a boat is loaded onto or unloaded from a trailer that uses conventional roller assemblies, the roller assemblies cross the strakes on the hull, and the compound curvature of the boat hull tends to urge some of the rollers to pivot out of contact with the hull. As a result, more of the weight of the boat is applied to the remaining rollers and the boat tends to assume a higher position on the trailer, thereby becoming more unwieldy and less stable.

A further problem caused by conventional roller mounts is that when the rollers cross the strakes on the boat hull, further instability and difficulty in loading or unloading the boat is created.

One method of dealing with these problems is to supply the trailer with a large number of rollers that are adjustable in their positions in response the changing shape of the hull of the boat as the boat is moved on or off the trailer. This increases the cost of the parts of the boat trailer and the assembly of the boat trailer, as well as increasing the cost of maintenance of the trailer. Also, this type of prior art roller support can be adequate for adjusting the heights of the rollers during the loading and unloading procedures, however, the angle of the hull of the boat also changes at the positions of the rollers and this is not accommodated by some prior art roller support designs.

A solution to some of the above noted problems is taught by my U.S. Pat. No. 5,316,329, which is incorporated herein by reference. The '329 patent teaches pairs of rollers mounted on the ends of U-shaped pivotal roller mounting arms and the roller mounting arms are each tiltably supported intermediate their ends at the curve of the U-shape on saddles. When the shape of the boat hull changes at the positions of the pairs of rollers, the U-shaped roller mounting arms slide along their lengths in their saddles to adjust the relative height of the pairs of rollers. This maintains both rollers of each pair of rollers in constant load bearing contact with the changing shape of the boat hull at the position of the rollers. This construction has provided a means by which the rollers of the trailer can conform to the changing shape of the boat hull as it is drawn onto or rolled off of the trailer. However, the visual image of this structure is not particularly pleasing, the time for assembly of this structure is excessive and the assembly must be carefully accomplished in order for the structure to provide the desired alignment of the boat rollers with the boat hull and to avoid premature wear and damage of the parts. Also, it would be desirable to have a structure that is more stable and durable than the prior art. It is to these problems and desires that this invention is directed.

SUMMARY OF THE INVENTION

Briefly described, the present invention comprises a boat trailer having sliding boat trailer roller mounts for supporting the hulls of boats on the trailer that are adjustable to conform to the changing shape of the boat hull as the boat is rolled on or rolled off the boat trailer. Each sliding boat trailer roller mount includes a pivotal support beam that is supported intermediate its ends on the frame of the trailer so that it can tilt in response to the changing shape of the boat drawn onto the trailer. Notches are formed at the ends of the pivotal support beam for receiving the mounting blocks and the mounting blocks are mounted in the notches at the ends of the pivotal support beams. A roller mounting arm having at its opposite ends rollers rotatably mounted thereon is supported by each mounting block. The mounting block defines a shallow U-shaped channel and the intermediate portion of the roller mounting arm has a similar U-shaped configuration that is slidably mounted along its length in the U-shaped channel. This sliding relationship allows for the tilting of the roller mounting arm and its rollers so that when the shape of the boat hull drawn onto the trailer changes, requiring the rollers to change in relative elevation, the roller mounting arm slides longitudinally through the channel to accommodate this function.

The mounting block is formed in two identical segments that mate with each other to form the shallow U-shaped channel that supports the roller mounting arm. The notches of the pivotal support beam are sized so that the mounting block, assembled with its segments placed together about a pivotal support beam, slides into the notch. Once the mounting block is seated in a notch, it becomes perfectly aligned and firmly supported in its place, in full control of the pivotal support beam while allowing the relative sliding motion as described.

Thus, it is an object of this invention to provide an improved sliding boat trailer roller mount for supporting the hulls of boats on a trailer.

Another object of this invention is to provide the combination of a boat trailer with a sliding boat trailer roller mount for accommodating boats with hulls of various designs while providing adequate support for the boat hulls as the boats are drawn onto or discharged from a boat trailer.

Another object of this invention is to provide a durable, easily assembled, supportive, stable sliding boat trailer roller mount that adjusts to the changing shapes of boat hulls at the positions of the rollers as a boat is drawn onto or discharged from a boat trailer.

Other objects, features and advantages of this invention will become apparent upon reading the following specification, when taken in conjunction with the accompanying drawings.

DETAILED DESCRIPTION

Figure 1:
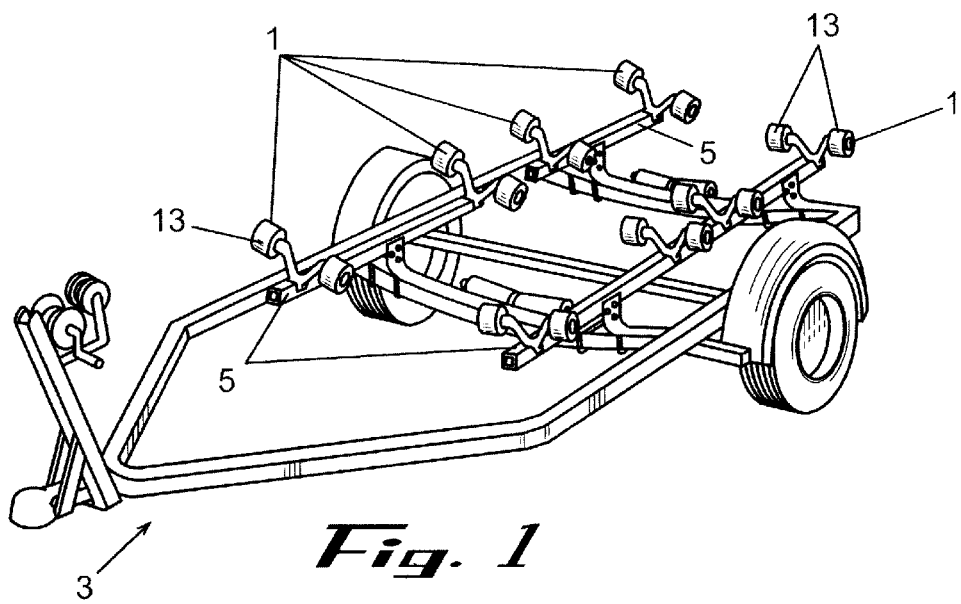
FIG. 1 is a perspective view of a boat trailer with a plurality of sliding boat trailer roller mounts.

Referring now in more detail to the drawings in which like numerals indicate like parts throughout the several views, FIG. 1 shows the general structure of a sliding boat trailer roller mount 1 in use with a boat trailer 3 that is used to transport boats 2. The roller mounts preferably are mounted in pairs on the ends of pivotal support beams 5. Preferably, the pivotal support beams 5 are mounted in two opposing pairs, with a forward pair that would extend beneath the boat hull near the bow of a boat, and a rearward pair that would extend beneath the boat hull at the stem of a boat.

Figure 2:
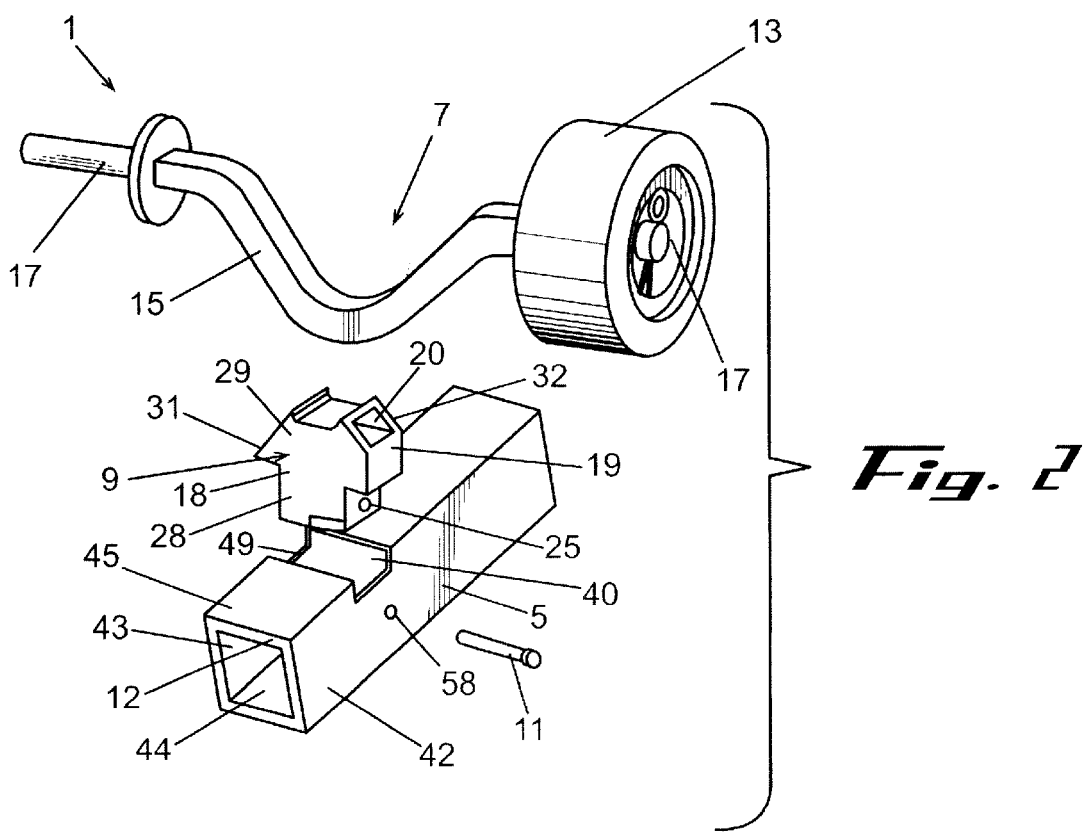
FIG. 2 is an exploded view of the boat trailer roller mount.

FIG. 2 shows the sliding boat trailer roller mount 1 on an end of a pivotal support beam 5. The sliding boat trailer roller mount, in accordance with the present invention, includes a roller mounting arm 7, a mounting block 9, a fastener 11, and a pair of rollers 13 (only one shown in FIG. 2). The roller mounting arm 7 is a bar with an intermediate arch 15 and with opposed ends 17 of the arch elongated horizontally. It is important that the roller mounting arm 7 is not rotatable with respect to the mounting block 9 so that the shallow U-shape of the roller mounting arm always stays upright. Accordingly, the roller mounting arm and the correspondingly shaped shallow U-shaped channel 20 of the mounting block are shown in a rectangular cross-sectional configuration. However, other non-circular shapes of these parts can be used as long as the shallow U-shaped arch of the roller mounting arm remains upright.

Figure 3:
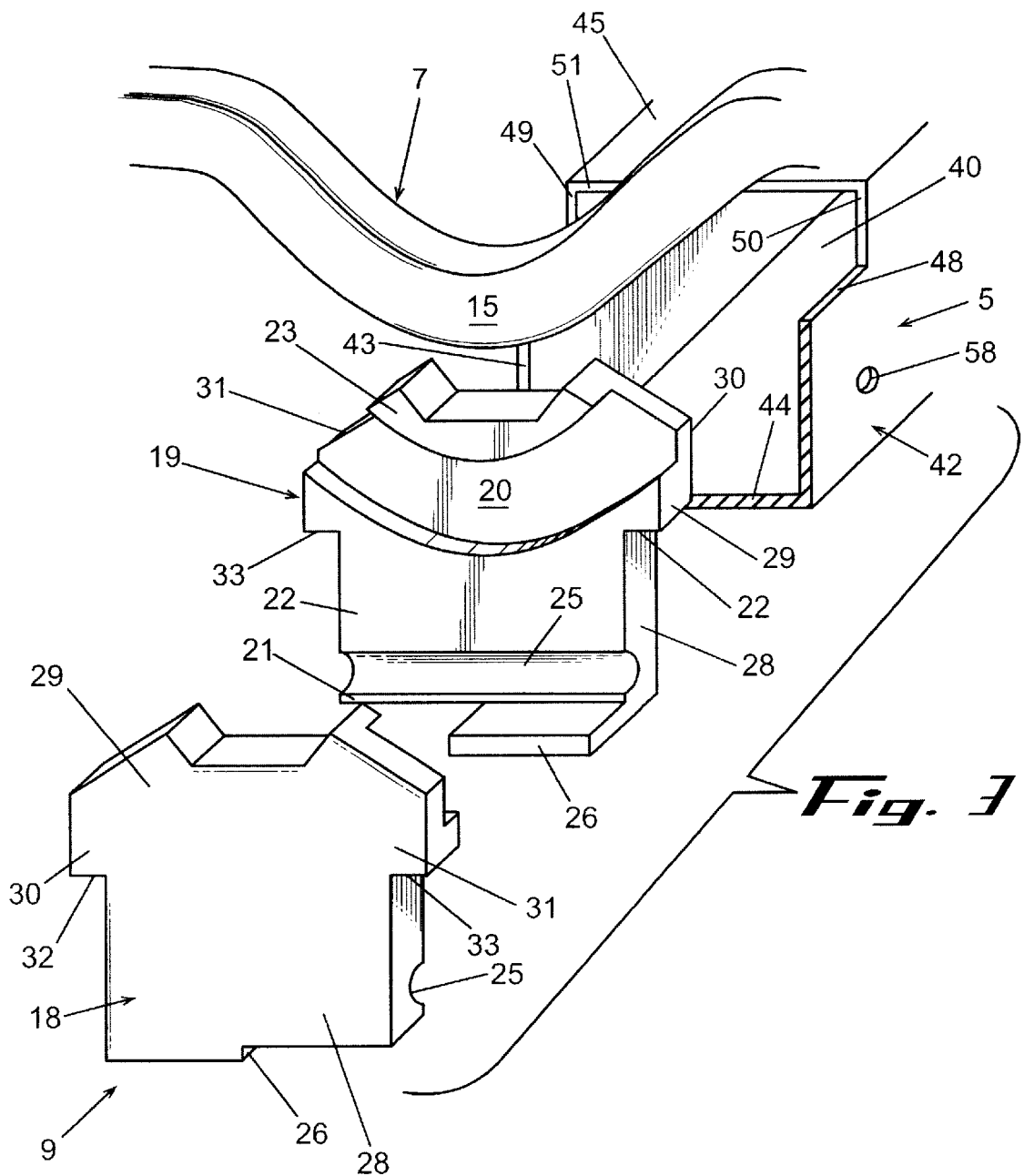
FIG. 3 is an expanded perspective illustration of the mounting block, showing a portion of the pivotal support beam and a portion of the roller mounting arm.
Figure 5:
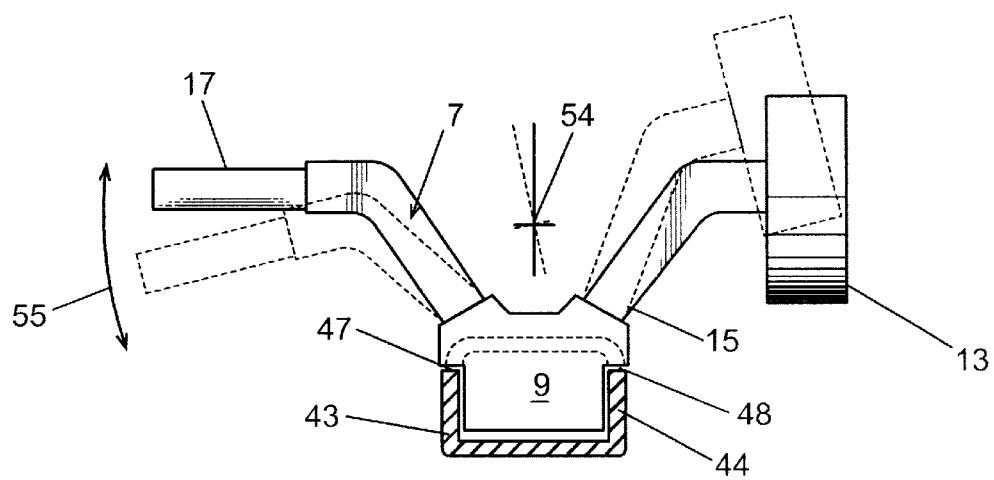
FIG. 5 is an elevation of the roller mounting arm and the mounting block, showing the lateral and pivotal displacement of the rollers during loading of a boat onto the boat trailer.

The mounting block shown in FIGS. 2, 3 and 5 is formed in two identical halves 18 and 19 and the halves fit together to form the completed mounting block. As shown in FIG. 3, each half 18 and 19 includes one half of an internal, shallow U-shaped channel 20 that is closed along its length and open at its ends for receiving the roller mounting arm 7. As can be see from FIG. 2, the roller mounting arm 7 includes the shallow U-shaped arch 15, and the U-shaped channel 20 is of a corresponding, compatible shape, which is also a shallow U-shape. Each half 18 and 19 of the mounting block includes laterally facing engagement surfaces 21, 22 and 23, with the shallow U-shaped channel 20 extending between engagement surfaces 22 and 23, and with a connector opening 25 extending between engagement surfaces 21 and 22. Stabilizing tab 26 extends laterally beneath engagement surface 21 from one of the halves of the mounting block to a position beneath the other half of the mounting block. This provides a lock between the halves of the mounting block so that they can be released from each other only with lateral relative movement.

The two meeting halves 18 and 19 of the mounting block include a lower portion 28 and an upper portion 29, with the upper portion being of larger lateral breadth than the lower portion and including overhanging shoulders 30 and 31. The shoulders define downwardly facing support surfaces 32 and 33 that will be described in more detail hereinafter.

Each pivotal support beam 5 includes a support notch 40 at each of its ends. The pivotal support beams are pivotally mounted on bolts 39 that extend through a clevis 37, with the clevis being mounted on a lateral beam 35 of the trailer framework. The pivotal support beams 5 are box beams, in that they include opposed parallel sidewalls 42 and 43, and opposed parallel bottom and top walls 44 and 45. The notches 40 are formed through the top wall 45 and extend downwardly partially through the opposed sidewalls 42 and 43, and the notches are of a length along the pivotal support beams 5 that corresponds to the width of the mounting block 9 when the halves of the mounting block are positioned in abutting, facing relationship, as shown in FIG. 2. The notches 40 include a pair of parallel extending horizontal support edges 47 and 48, opposed vertical bearing surfaces 49 and 50 at each end of the notches, and upper lateral bearing surface 51. When the halves 18 and 19 of the mounting block 9 are assembled, by placing the shallow U-shaped channel 20 of each half of the mounting block about the arch 15 of the mounting arm 7 and urging the halves together until their laterally facing engagement surfaces 21, 22 and 23 are in abutment with one another, the assembled mounting block and roller mounting arm 7 are then inserted into the support notch 40. The downwardly facing support surfaces 32 and 33 of the overhanging shoulders 30 and 31 are placed in engagement with the parallel support edges 47 and 48 of the notch, and with the vertical bearing surfaces 49 and 50 and the upper bearing surface 51 at the ends of the notch in abutment with the opposed front and rear surfaces of the overhanging shoulders 30 and 31. This securely holds the mounting block 9 in the notch of the pivotal support beam 5, and the shallow U-shaped arch 15 of the roller mounting arm 7 is slidably positioned in the shallow U-shaped channel 20 of the mounting block.

The curvature of the shallow U-shaped arch 15 is compatible with the curvature of the shallow U-shaped channel 20 of the mounting block, so that there can be longitudinal movement of the roller mounting arm 7 in the channel 20. This is best illustrated in FIG. 5, where both of the shallow U-shaped configurations of the arch 15 and the channel 20 find a common center of curvature 54 so that the parallel opposed ends 17 of the roller mounting arm 7 can move up or down, as indicated by direction arrow 55, as shown in FIG. 5. This causes the rollers 13 to move up and down so that the upward movement of one roller corresponds to the downward movement of its opposed roller.

Once the mounting block 9 and its roller mounting arm 7 are securely placed in a notch 40 at the end of a pivotal support beam 5, the connector opening 25 of the assembled mounting block registers with opposed aligned side openings 58 of the pivotal support beam 5, and fastener 11 is inserted through the aligned openings. Fastener 11, typically a bolt, keeps the mounting block 9 from moving upwardly and out of the notch 40.

Figure 4:
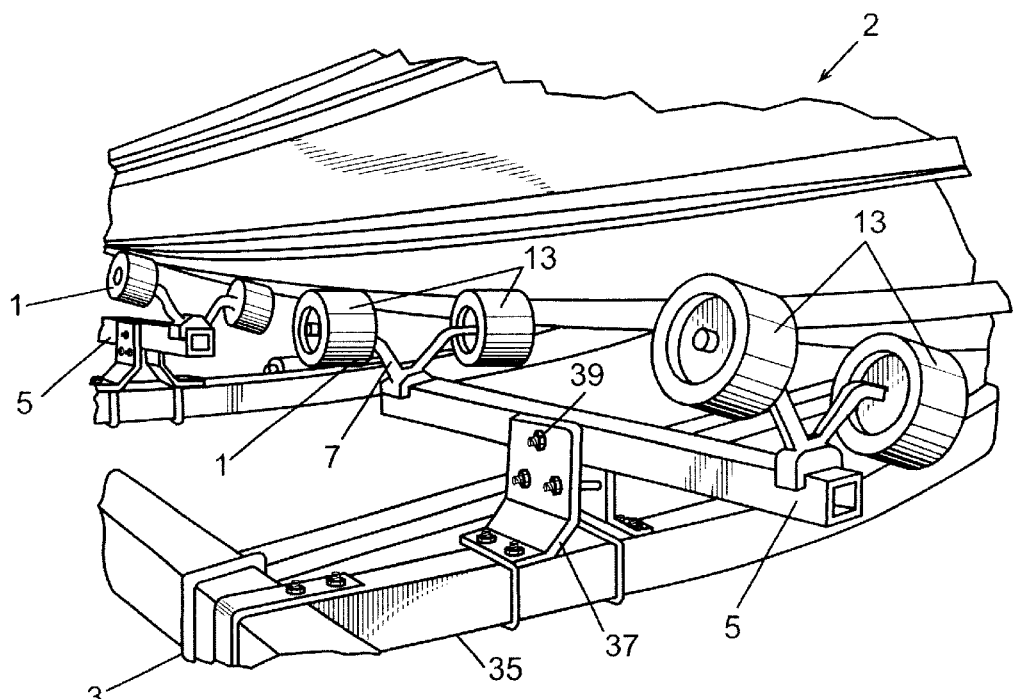
FIG. 4 is a close-up perspective view of the plurality of boat trailer roller mounts in use with a boat.
Figure 6:
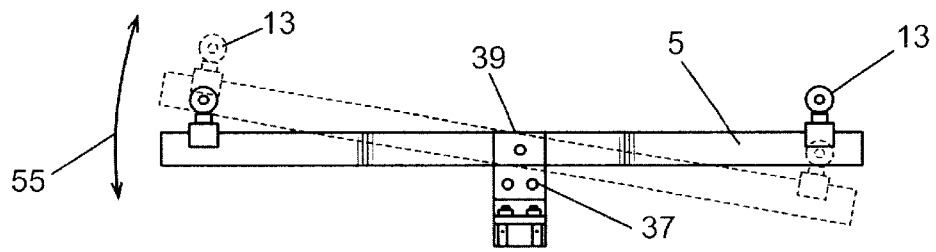
FIG. 6 is a side view of the pivotal support beam, showing the pivoting action during loading of a boat.

As best shown in FIGS. 4 and 6, the pivotal support beams 5 are supported intermediate their ends on clevis 37, so that the rollers 13 can move up and down in response to the curved hull of a boat engaging the rollers. In addition, the pairs of rollers (FIGS. 4 and 5) can move up and down to accommodate the changing shape of the hull at the position of the rollers, so that when one roller moves up, its companion roller moves downwardly, and vice-versa.

The mounting block 9 is fabricated of nylon or other structural material that is of sufficient strength to bear the forces applied thereto and so that sufficient lubricity is provided to allow the arched portion 15 of the roller mounting arm 7 to move longitudinally through the shallow U-shaped channel 20 of the mounting block. A preferred material for the mounting block 9 is glass-reinforced thermal plastic acetyl resin. A suitable material is commercially available from Dow Chemical Company of Midland, Mich., under the trade name "Delrin."

It will be noted that the simple construction of the halves 18 and 19 of the mounting block, and the manner in which the mounting block halves fit together to form the mounting block 9, together with the simple shape and construction of the support notch 40 that supports the mounting block, results in extremely simple and easy assembly of the mounting block about the arched intermediate portion 15 of the roller mounting arm, and the insertion of the assembly downward into the notch. The fastener 11 is used simply to keep the assembly from moving upwardly out of the notch of the pivotal support beam 5.

A feature of the invention is that both the shallow U-shaped channel 20 of the mounting block 9 and the arch 15 of the roller mounting arm 7 are positioned at a level that extends into the notch 40 of the pivotal support beam 5. This design causes the surfaces of the notch to reinforce the mounting block so that it is able to resist being pried open by the forces applied by the roller mounting arm.

The rollers 13 typically will be made of a soft material, such as rubber, and usually will be conventional 4" to 5" diameter rubber rollers with sleeve bearings. The rollers are retained on the parallel opposed ends of the arch by means of a retaining pin or other conventional connector.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. A sliding boat trailer roller mount for supporting the hull of a boat on a trailer, comprising:
   a support beam defining a notch,
   a mounting block positioned in said notch of said support beam and defining a shallow U-shaped channel closed along its length and open at its ends,
   a roller mounting arm having opposed ends and an intermediate portion being of a shape that corresponds to the shallow U-shape of said mounting block and slidably mounted along the length of said channel of said mounting block with said opposed ends extending from said mounting block,
   rollers rotatably mounted on said opposed ends of said roller mounting arm for engaging the hull of a boat carried by the trailer.

2. The sliding boat trailer roller mount of claim 1, wherein said mounting block is formed in two mating halves that form said shallow U-shaped channel,
   said notch of said support beam holding said mating halves of said mounting block together.

3. The sliding boat trailer roller mount of claim 1, and further including a fastener holding said mounting block to said support beam.

4. The sliding boat trailer roller mount of claim 1, wherein said support beam is rectangular in cross section and includes opposed upper and lower walls and opposed sidewalls, and said notch is formed in said upper wall and said sidewalls.

5. The sliding boat trailer roller mount of claim 4, wherein said support beam is tubular.

6. The sliding boat trailer roller mount of claim 4, wherein said mounting block includes a lower portion that fits between said sidewalls of said support beam and an upper portion that is of larger breadth than said support beam and protrudes beyond said sidewalls of said support beam.

7. The sliding boat trailer roller mount of claim 6, wherein said upper portion of said support block rests on said notch.

8. The sliding boat trailer roller mount of claim 1, wherein said roller mounting arm and said channel of said support block are both of non-circular cross section.

9. The sliding boat trailer roller mount of claim 1, wherein said intermediate portion of said roller mounting arm extends into said notch of said support beam.

10. A sliding boat trailer roller mount for supporting a boat hull on a trailer, comprising:
    an elongated tubular support beam having opposed ends and an intermediate portion for mounting on a trailer,
    said elongated tubular support beam defining an upper wall and opposed side walls and a notch formed in said upper wall and partially down said side walls at each end of said support beam,
    a mounting block positioned in each of said notches at the opposed ends of said support beam and defining an elongated shallow U-shaped channel having a concavely curved bottom, and
    a roller mounting arm with opposed ends and an intermediate curved portion, said intermediate curved portion positioned in and movable along the length of said channel of each of said mounting blocks.

11. The sliding boat trailer roller mount of claim 10, wherein said intermediate curved portion of each said roller mounting arm and each said channel of said mounting block extending through said notches of said support beam.

12. The sliding boat trailer roller mount of claim 10, wherein each of said mounting blocks includes a lower body portion that fits between said side walls of said support beam, and an upper portion of greater breadth than said support beam that extends laterally from said notch.

13. The sliding boat trailer roller mount of claim 11, and further including a fastener extending through said support beam and said support block for fastening said support block to said support beam.

14. A boat trailer for transporting a boat comprising:
    a framework having lateral beams,
    an elongated support beam having opposed ends and an intermediate portion,
    a clevis pivotally mounting said elongated support beam at its intermediate portion to one of said lateral beams,
    notches formed at each end of said support beam,
    a mounting block positioned in each notch,
    an elongated roller mounting arm having opposed ends and an intermediate arched portion,
    said arched portion of said roller mounting arm slidably received in said mounting block, and
    boat engaging rollers mounted on said opposed ends of said roller mounting arm for engaging and supporting a hull of a boat.

15. The boat trailer of claim 14, wherein
    said mounting blocks are formed in mating halves that form a shallow U-shaped channel,
    said arches of said roller mounting arms received in an slideable with respect to said shallow U-shaped channels.

16. The boat trailer of claim 15, wherein said notches of said support beam are configured to resist the halves of said support block from parting.

* * * * *